UNITED STATES PATENT OFFICE.

MAX MOELLER, OF BERLIN, GERMANY, ASSIGNOR TO THE ACTIEN-GESELLSCHAFT FÜR ANILIN FABRIKATION, OF SAME PLACE.

PRODUCTION OF AMIDO-NAPHTHOL DISULFONIC ACID.

SPECIFICATION forming part of Letters Patent No. 511,708, dated December 26, 1893.

Application filed March 18, 1893. Serial No. 466,691. (Specimens.)

*To all whom it may concern:*

Be it known that I, MAX MOELLER, of Berlin, in the Kingdom of Prussia, German Empire, have invented new and useful Improvements in the Production of Amido-Naphthol Disulfonic Acid; and I do hereby declare that the following is a full, clear, and exact description thereof, which will enable others skilled in the art to which it appertains to make and use the same.

This invention relates to the production of a new amidonaphtol-disulfonic acid. For this purpose, the alphanaphtylaminedisulfonic acid, mentioned in the German Patent No. 40,571 is first converted by sulfonation into alphanaphtylaminetrisulfonic acid, and this is transformed by melting with caustic alkalies into the new amidonaphtoldisulfonic acid.

The following is an example illustrating the manner in which this invention can be carried into practical effect, but without limiting the process to the precise details stated.

A mixture of one part of the sodium salt of the alphanaphtylaminedisulfonic acid (German Patent No. 40,571) and of three parts of fuming sulfuric acid (containing about twenty-three per cent. of anhydride) is heated upon the water bath until the formation of the trisulfonic acid is completed, as tested by finding that a sample diluted with water and treated with nitrite, ceases to form coloring matters with phenols. The melt is then poured into water and converted into the lime salt or soda salt in the usual manner. The neutral and acid soda salts of the alphanaphtylaminetrisulfonic acid thus obtained, as well as the free acid itself, are very readily soluble in water; the alkaline solution showing a very splendid yellowish green fluorescence. The duration of the sulfonating process and the temperature at which it is to be carried out depend on the strength of the fuming sulfuric acid and may be varied accordingly. In order to transform the alphanaphtylaminetrisulfonic acid thus obtained into amidonaphtoldisulfonic acid, one part of the soda salt of the alphanaphtylaminetrisulfonic acid is melted with about three parts of caustic potash and some water, in an open or closed vessel, at 170° to 220° centigrade, until a sample, diluted with water and rendered alkaline, ceases to show the characteristic fluorescence of the alphanaphtylaminetrisulfonic acid. The melt is then dissolved in such a quantity of water and hydrochloric acid as to form a saturated slightly acid salt solution, from which on cooling the acid soda salt of the new amidonaphtoldisulfonic acid separates in light gray crystalline needles.

The new acid is readily soluble in cold and hot water; it yields no diazo compound when treated with nitrite; with ferric chlorid it produces a dark-green solution; combined with diazo—or tetrazo—compounds it yields dyestuffs; the new acid combines with only one molecule of a diazo-body, and differs in this respect from the isomeric amidonaphtoldisulfonic acid mentioned in the English Patent No. 13,443 of 1890.

According to its formation and general properties the new acid is to be regarded as a disulfonic acid of 1:8 amidonaphtol.

Having now described my invention and in what manner it is to be carried out, what I claim as new, and desire to secure by Letters Patent, is—

1. The process of producing a new amido-naphtol-disulfonic acid or its salts which consists in converting the alphanaphtylamine-disulfonic acid, substantially as described by further sulphonation into alphanaphtylaminetrisulfonic acid and melting the salts of the latter with caustic alkalies in an open or a closed vessel.

2. As a new product the amido-naphtol-disulfonic acid, soluble in water yielding no diazo compound when treated with nitrite, turning dark green on the addition of ferric-chlorid; the acid soda salt of which crystallizes in the form of light-gray needles, is readily soluble in water, insoluble in alcohol and does not show any fluorescence in aqueous solution.

In testimony whereof I hereunto set my hand and affix my seal, in the presence of two witnesses, this 18th day of February, A. D. 1893.

MAX MOELLER. [L. S.]

Witnesses:
BERNHOLD SCHÖNBRODT,
GUSTAV LUCHT.